United States Patent
Hoshino

(10) Patent No.: US 11,904,652 B2
(45) Date of Patent: Feb. 20, 2024

(54) VEHICLE CONTROL DEVICE

(71) Applicant: Toyota Jidosha Kabushiki Kaisha, Toyota (JP)

(72) Inventor: Yu Hoshino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 17/739,312

(22) Filed: May 9, 2022

(65) Prior Publication Data

US 2023/0001762 A1    Jan. 5, 2023

(30) Foreign Application Priority Data

Jul. 2, 2021   (JP) .................... 2021-110520

(51) Int. Cl.
*B60H 1/00*    (2006.01)

(52) U.S. Cl.
CPC ..... *B60H 1/00278* (2013.01); *B60H 1/00021* (2013.01); *B60H 2001/003* (2013.01); *B60H 2001/00114* (2013.01); *B60H 2001/00307* (2013.01)

(58) Field of Classification Search
CPC ............ B60H 1/00278; B60H 1/00021; B60H 1/00114; B60H 2001/003; B60H 2001/00307

See application file for complete search history.

(56) References Cited

U.S. PATENT DOCUMENTS

| | | | | |
|---|---|---|---|---|
| 9,212,599 | B2 * | 12/2015 | Gao | B60L 58/21 |
| 10,118,460 | B1 * | 11/2018 | Blatchley | B60H 1/00428 |
| 10,800,398 | B2 * | 10/2020 | Duan | B60W 10/08 |
| 10,933,823 | B2 * | 3/2021 | Akuzawa | B60L 58/18 |
| 11,014,451 | B2 * | 5/2021 | Zou | B60L 1/006 |
| 11,075,414 | B2 * | 7/2021 | Yokotsuji | B60L 58/26 |
| 11,548,391 | B2 * | 1/2023 | Books | B60L 58/12 |
| 11,584,357 | B2 * | 2/2023 | Edman | B60L 58/26 |
| 2001/0045779 | A1 * | 11/2001 | Lee | H02J 9/061 307/66 |
| 2002/0157414 | A1 * | 10/2002 | Iwanami | B60H 1/323 165/254 |
| 2002/0163198 | A1 * | 11/2002 | Gee | B60W 10/26 290/40 C |

(Continued)

FOREIGN PATENT DOCUMENTS

| | | | | |
|---|---|---|---|---|
| CN | 110359973 A | * | 10/2019 | ......... B60H 1/00278 |
| JP | 2005093434 A | * | 4/2005 | ......... B60H 1/00278 |

(Continued)

*Primary Examiner* — Ljiljana V. Ciric
(74) *Attorney, Agent, or Firm* — Dinsmore & Shohl LLP

(57) ABSTRACT

A vehicle control device that controls an air conditioning device and a battery in a vehicle that uses a coolant of the air conditioning device that cools a vehicle cabin for cooling the battery, the vehicle control device including: an air conditioning load determination unit that determines whether the air conditioning device is driven by a predetermined load or more; and a battery input-output control unit that controls at least one of an input power or an output power of the battery. When the air conditioning device is driven by the predetermined load or more, at least one of the input power or the output power is restricted without cooling the battery.

4 Claims, 4 Drawing Sheets

(56) References Cited

U.S. PATENT DOCUMENTS

| | | | | |
|---|---|---|---|---|
| 2004/0168454 | A1* | 9/2004 | Iritani | B60H 1/004 903/918 |
| 2006/0061922 | A1* | 3/2006 | Mihai | H02J 7/34 361/20 |
| 2015/0013367 | A1* | 1/2015 | Carpenter | F25B 49/02 62/222 |
| 2019/0221899 | A1* | 7/2019 | Tomai | H01M 10/613 |
| 2021/0040378 | A1 | 2/2021 | George et al. | |
| 2021/0283991 | A1* | 9/2021 | Tsuboi | B60H 1/3225 |
| 2022/0271363 | A1* | 8/2022 | Burkell | B60L 58/27 |
| 2023/0001762 | A1* | 1/2023 | Hoshino | B60H 1/00021 |
| 2023/0040086 | A1* | 2/2023 | Park | B60H 1/143 |
| 2023/0253644 | A1* | 8/2023 | Kouchi | H01M 10/615 429/7 |

FOREIGN PATENT DOCUMENTS

| | | | | |
|---|---|---|---|---|
| JP | | 5100959 B2 * | 12/2012 | B60H 1/00278 |
| JP | 20210040378 A1 | | 3/2021 | |

* cited by examiner

VEHICLE CONTROL DEVICE

CROSS-REFERENCE TO RELATED APPLICATION

This application claims priority to Japanese Patent Application No. 2021-110520 filed on Jul. 2, 2021, incorporated herein by reference in its entirety.

BACKGROUND

1. Technical Field

The present disclosure relates to a vehicle control device that controls an air conditioning device and a battery.

2. Description of Related Art

Conventionally, as a vehicle control device, there is one described in Japanese Unexamined Patent Application Publication No. 2021-40378 (JP 2021-40378 A). This vehicle control device increases the upper limit of the battery output when the air conditioning device is in the high load state. As a result, even when the accelerator pedal is greatly depressed in the high load state of air conditioning, a large amount of electric power can be supplied from the battery to the drive motor.

SUMMARY

In the control of the vehicle control device, there is a possibility that the battery temperature increases when the air conditioning is in a high load state, and the battery deteriorates. However, the battery deterioration due to such an increase in the battery temperature can also occur in vehicles that cool that battery by air conditioning.

Specifically, in a vehicle that cools the battery by air conditioning, when the control is performed to prohibit battery cooling for a certain period of time when the air conditioning is in a high load state, the cooling performance of the air conditioning device is preferentially used for cooling the passenger compartment. As a result, the cooling performance of the vehicle cabin is less likely to deteriorate, and it is easy to ensure the comfort of the occupant. However, when such a control is performed in an area where the outside air temperature is high, for example, the Middle East, the battery temperature may become excessively high and the battery may deteriorate. Thus, there is a case in which battery cooling cannot be prohibited. Thus, there is case in which the cooling performance of the vehicle cabin may be lowered by the amount in which battery cooling is performed, and the comfort of the occupant is lowered.

Therefore, an object of the present disclosure is to provide a vehicle control device in which deterioration of the cooling performance can be suppressed and battery deterioration due to an increase in a battery temperature can be suppressed when air conditioning is in a high load state in a vehicle in which battery cooling is performance by air conditioning.

In order to solve the above problems, a vehicle control device according to the present disclosure is a vehicle control device that controls an air conditioning device and a battery in a vehicle that uses a coolant of the air conditioning device that cools a vehicle cabin for cooling the battery, the vehicle control device including: an air conditioning load determination unit that determines whether the air conditioning device is driven by a predetermined load or more; and a battery input-output control unit that controls at least one of an input power or an output power of the battery, in which when the air conditioning device is driven by the predetermined load or more, at least one of the input power or the output power is restricted without cooling the battery.

According to the present disclosure, the battery is not cooled when the air conditioning device is driven by a predetermined load or more. Thus, when the air conditioning device is driven by a predetermined load or more, the cooling performance of the air conditioning device used for cooling the battery can be used for cooling the vehicle cabin, and the comfort of the occupants can be easily ensured.

Further, when the air conditioning device is driven by a predetermined load or more, since at least one of the input power and the output power in the battery is restricted, the heat generation of the battery can be suppressed and the deterioration of the battery due to the rise in the battery temperature can be suppressed.

In the vehicle control device according to the present disclosure, the vehicle control device may further include: an outside air temperature detection unit that detects an outside air temperature of the vehicle; and an outside air temperature determination unit that determines whether the outside air temperature is lower than a predetermined temperature, in which when the outside air temperature is lower than the predetermined temperature, the input power and the output power may not restricted.

According to the present configuration, the input power and the output power to the battery is not restricted in the situation where the outside air temperature at which the battery temperature does not easily rise is less than a predetermined temperature. Thus, it is possible to suppress excessive restriction of the input power and the output power in the battery, and it is possible to suppress deterioration of the running performance due to the restriction.

In the vehicle control device according to the present disclosure, the vehicle control device may further include: a battery temperature detection unit that detects a temperature of the battery; and a battery temperature determination unit that determines whether the temperature of the battery is lower than a predetermined temperature, in which when the temperature of the battery is lower than the predetermined temperature and the air conditioning device is driven by the predetermined load or more, the input power and the output power may not be restricted.

According to the present configuration, since the input power and the output power in the battery can be restricted in consideration of the temperature of the battery, it is possible to suppress the excessive restriction of the input power and the output power.

In the vehicle control device according to the present disclosure, when the air conditioning device is driven by the predetermined load or more, only a supply of power to the battery may be restricted and an output of power from the battery may not be restricted.

According to the present configuration, by restricting only the input of power to the battery, it is possible to suppress the rise in battery temperature while reducing the deterioration of running performance due to the restriction of the output of the battery.

In the vehicle control device according to the present disclosure, deterioration of the cooling performance can be suppressed and battery deterioration due to an increase in a battery temperature can be suppressed when air conditioning is in a high load state in a vehicle in which battery cooling is performance by air conditioning.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
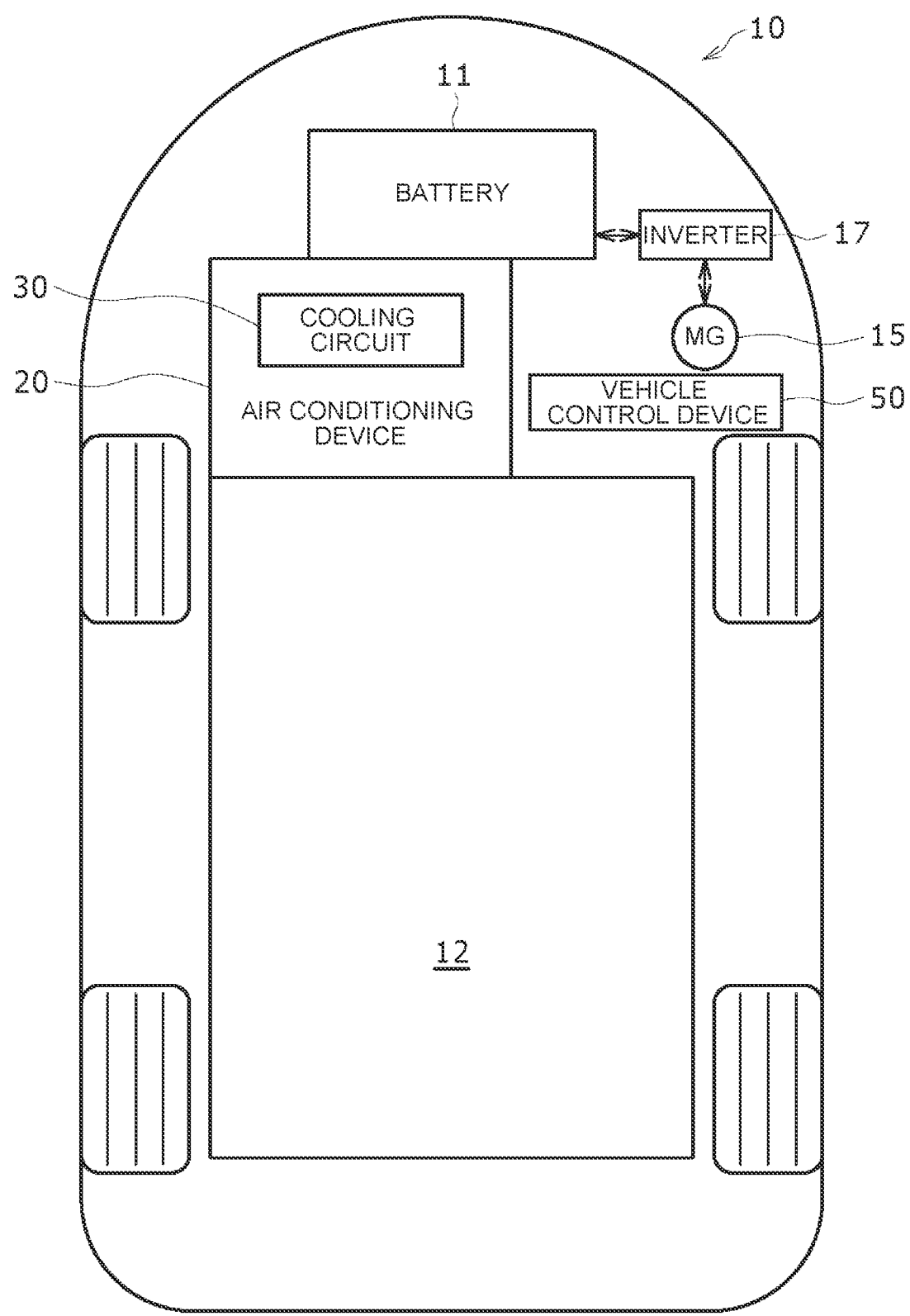
FIG. 1 is a schematic configuration diagram of a vehicle according to an embodiment of the present disclosure.

Hereinafter, embodiments according to the present disclosure will be described in detail with reference to the accompanying drawings. When a plurality of embodiments and modifications are included in the following, it is assumed from the beginning that a new embodiment is constructed by appropriately combining the characteristic portions thereof. Further, in the following examples, the same components are designated by the same reference numerals in the drawings, and duplicate description will be omitted.

FIG. 1 is a schematic configuration diagram of a vehicle 10 according to an embodiment of the present disclosure. Although the vehicle 10 is a battery electric vehicle (BEV) traveling by power generated by a motor generator 15, the vehicle 10 may be a hybrid electric vehicle (HEV) traveling by power generated by an engine and a motor generator, or may be a plug-in hybrid electric vehicle (PHEV). As shown in FIG. 1, the vehicle 10 includes the motor generator 15, a battery 11 electrically connected to the motor generator 15 via an inverter 17, an air conditioning device 20 that adjusts the air in a vehicle cabin 12 and that cools the battery 11, and a vehicle control device 50 that controls the air conditioning device 20 and that also controls the input and output of electric power in the battery 11.

The motor generator 15 is composed of, for example, a three-phase AC motor, and the battery 11 is composed of a secondary battery such as a lithium ion battery. The DC power output by the battery 11 is converted into AC power by the inverter 17 and then supplied to the motor generator 15. In contrast, when the motor generator 15 generates AC power by the regenerative operation, the AC power is converted into DC power by the inverter 17, and then the battery 11 is charged.

Figure 2:
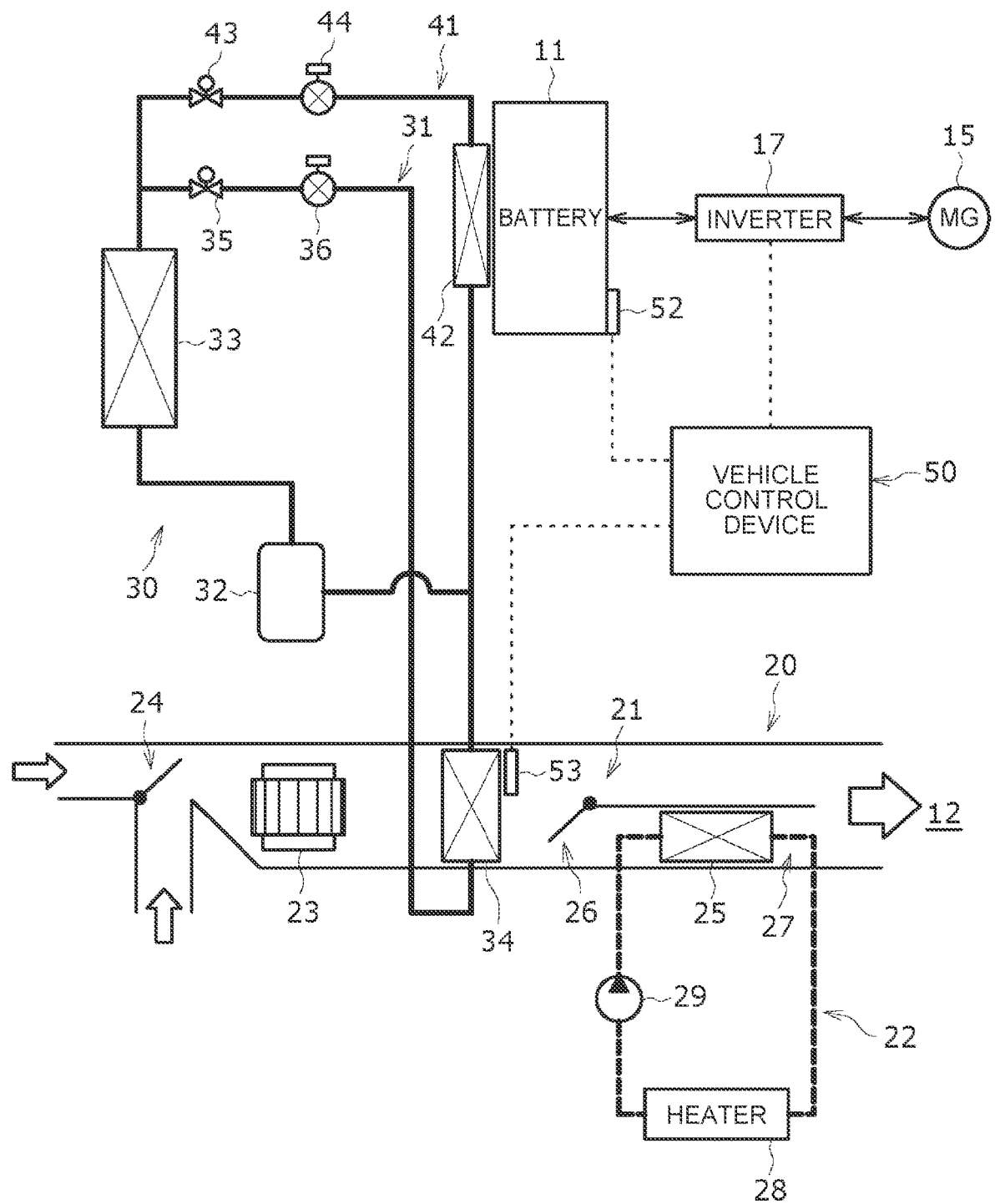
FIG. 2 is a diagram illustrating a configuration of an air conditioning device.

FIG. 2 is a diagram illustrating the configuration of the air conditioning device 20. As shown in FIG. 2, the air conditioning device 20 includes an air passage 21 that adjusts the inside of the vehicle cabin 12, a heating circuit 22 that heats the air supplied to the vehicle cabin 12, and a cooling circuit 30 that cools the air supplied to the vehicle cabin 12 and that cools the battery 11.

The air conditioning device 20 includes a blower 23 that generates an air flow toward the vehicle cabin 12 in the air passage 21, an inside-outside air switching door 24 that switches between the introduction of air (inside air) inside the vehicle cabin 12 and the introduction of air (outside air) outside the vehicle 10, an evaporator 34 that is connected to the cooling circuit 30 and that cools the air passing through the air passage 21 by evaporating the coolant, a heater core 25 that constitutes a part of the heating circuit 22 and that heats the air passing through a heating air passage 27, and an air mix door 26 that opens and closes the heating air passage 27.

The heating air passage 27 is provided in the air passage 21. Further, the heater core 25 is installed in the heating air passage 27 and heats the air flowing through the heating air passage 27. In addition to the heater core 25, the heating circuit 22 includes a heater 28 for heating the water circulating in the heating circuit 22 and a pump 29 for circulating the water in the heating circuit 22. The heating circuit 22 is a circuit that heats the heater core 25 by circulating water heated by the heater 28 as a heat source, and that heats the air passing through the heating air passage 27 by the heated heater core 25.

The cooling circuit 30 is a circuit that circulates the coolant by a steam compression refrigeration cycle and that supplies the coolant to an air cooling circuit 31 and a battery cooling circuit 41 to cool the air in the vehicle cabin 12 and the battery 11. The cooling circuit 30 can supply the coolant to only one of the air cooling circuit 31 or the battery cooling circuit 41 and cool only one of them. The cooling circuit 30 includes the air cooling circuit 31, the battery cooling circuit 41, a compressor 32 for compressing the coolant, and a condenser 33 for condensing the high-temperature and high-pressure coolant discharged from the compressor 32.

The air cooling circuit 31 is a circuit that cools the air in the vehicle cabin 12 in response to the cooling request of the air conditioning device 20. The air cooling circuit 31 includes the evaporator 34 provided inside the air passage 21, an air cooling solenoid valve 35 that is provided on the upstream side of the evaporator 34 and that opens and closes the air cooling circuit 31, and an air cooling expansion valve 36 that is provided on the upstream side of the evaporator 34 and that adjusts the coolant circulation amount supplied to the evaporator 34.

The battery cooling circuit 41 is a circuit for cooling the battery 11. The battery cooling circuit 41 includes a battery heat exchanger 42 that is provided close to the battery 11 and the battery heat exchanger 42, a battery cooling solenoid valve 43 that is provided on the upstream side of the battery heat exchanger 42 and that opens and closes the battery cooling circuit 41, and a battery cooling expansion valve 44 that is provided on the upstream side of the battery heat exchanger 42 and that adjusts the coolant circulation amount supplied to the battery heat exchanger 42. The battery cooling circuit 41 cools the battery 11 by exchanging heat with the battery heat exchanger 42 using the coolant.

Figure 3:
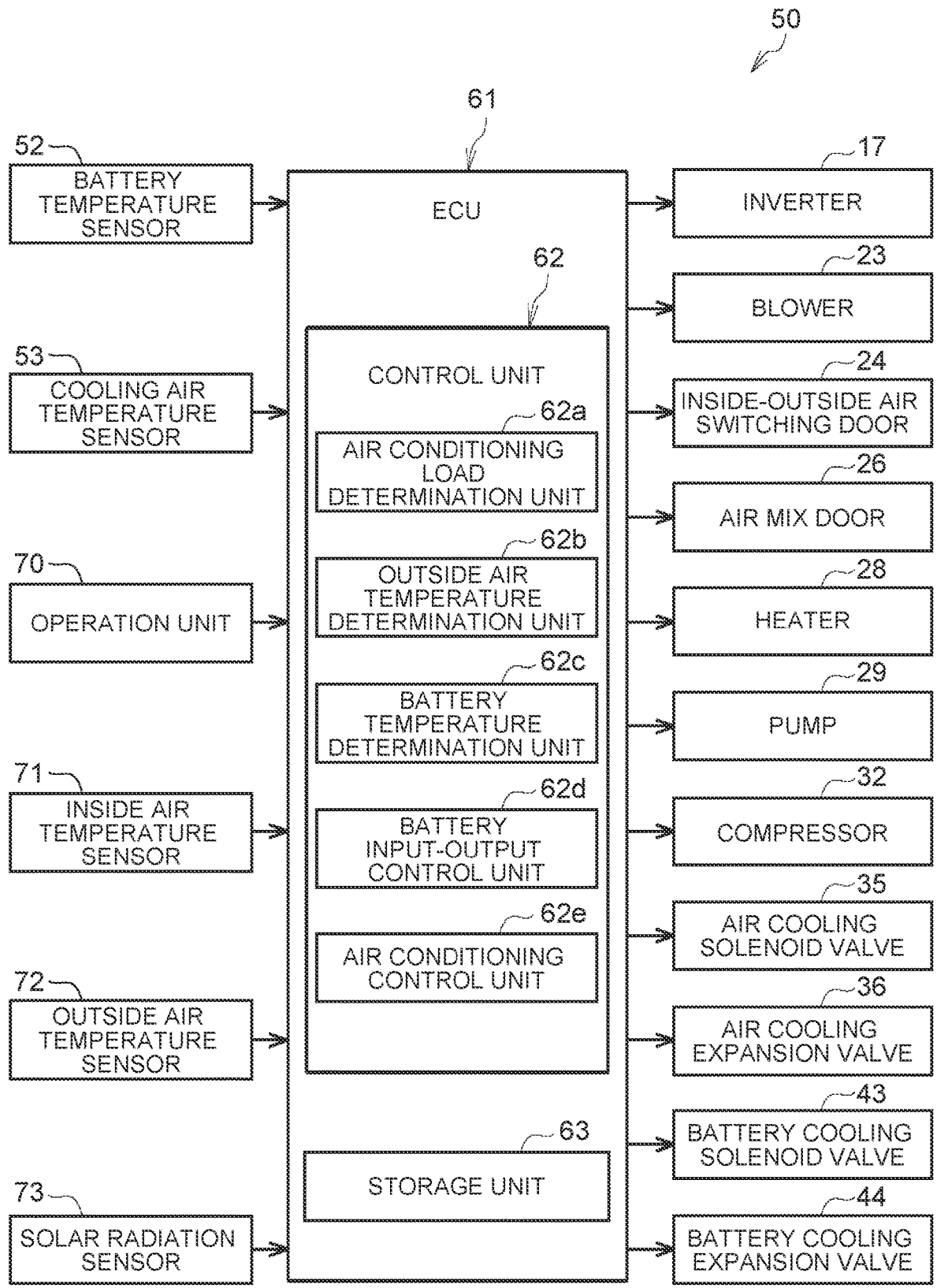
FIG. 3 is a control block diagram of a vehicle control device.
Figure 4:
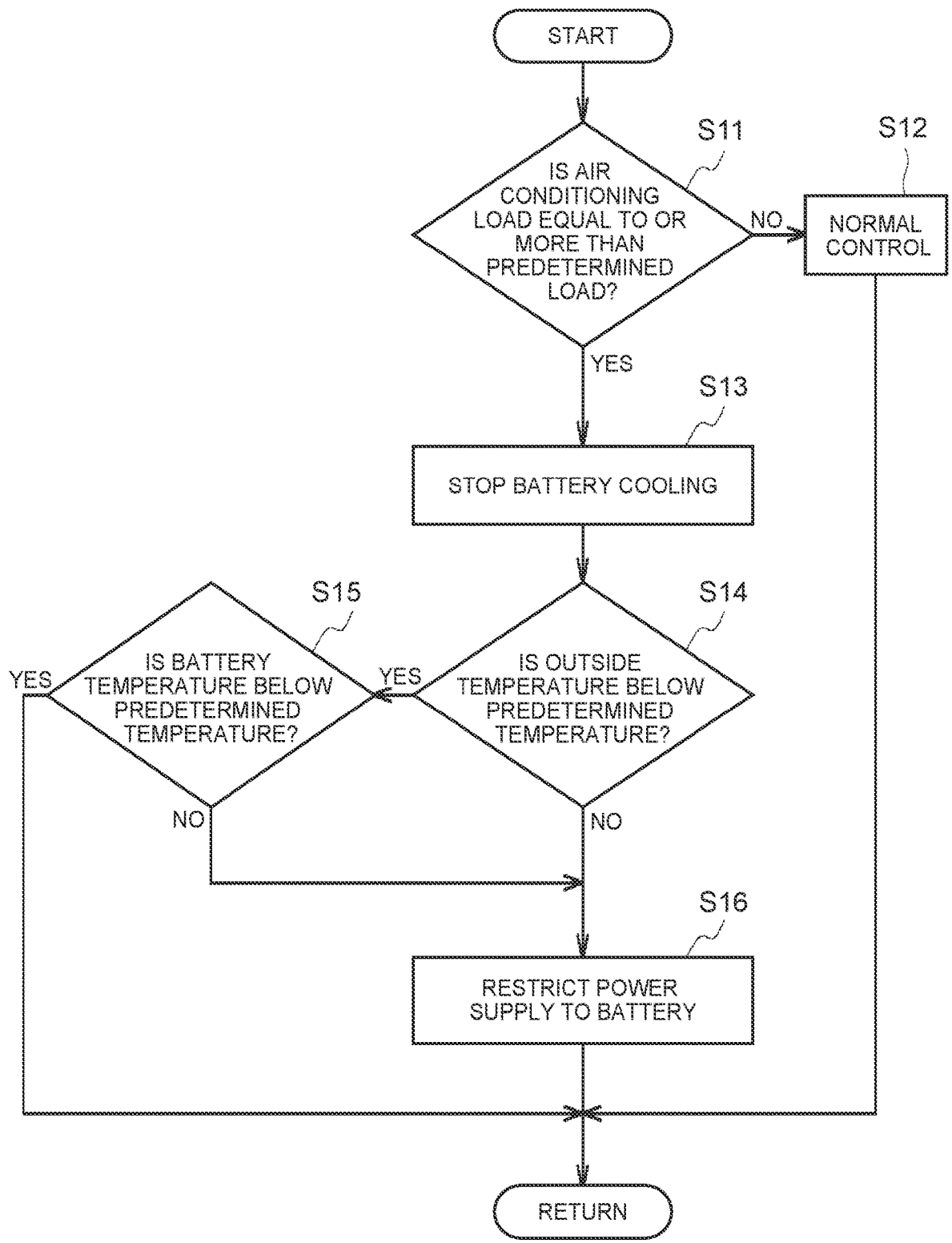
FIG. 4 is a flowchart illustrating an example of control of a vehicle control device.

Next, the vehicle control device 50 will be described with reference to FIGS. 2 to 4. FIG. 3 is a control block diagram of the vehicle control device 50, and FIG. 4 is a flowchart illustrating an example of control of the vehicle control device 50. As shown in FIG. 3, the vehicle control device 50 includes an electronic control unit (ECU) 61, a battery temperature sensor 52 that detects the temperature of the battery 11, a cooling air temperature sensor 53 that detects the cooling air temperature after the cooling air passes through the evaporator 34, an operation unit 70 capable of changing the set temperature of the vehicle cabin 12, an inside air temperature sensor 71 that detects the temperature of the vehicle cabin 12, an outside air temperature sensor 72 that detects the outside air temperature, and a solar radiation sensor 73.

The ECU 61 is composed of a computer such as a microcomputer, and includes a control unit 62 and a storage unit 63. The control unit 62, that is, the processor includes, for example, a central processing unit (CPU). The storage unit 63 is composed of a hard disk drive (HDD), a semiconductor memory, or the like, and the semiconductor memory is composed of a non-volatile memory such as a read only memory (ROM) or a volatile memory such as a random access memory (RAM). The storage unit 63 may be composed of only one storage medium, or may be composed of a plurality of different storage media. The non-volatile memory stores a control program, a predetermined threshold value, and the like in advance. Further, the volatile memory temporarily stores the read control program, the threshold value, the processing data, and the like. Further, the CPU performs signal processing according to a program stored in advance in the ROM while using, for example, the temporary storage function of the RAM.

Based on the signal received from various sensors 52, 53, 71, 72, 73 described above and the signal received from the operation unit 70, the ECU 61 controls the inverter 17, the blower 23, the inside-outside air switching door 24, the air mix door 26, the heater 28, the pump 29, the compressor 32, the air cooling solenoid valve 35, the air cooling expansion valve 36, the battery cooling solenoid valve 43, and the battery cooling expansion valve 44.

Specifically, the control unit 62 includes an air conditioning load determination unit 62a, an outside air temperature determination unit 62b, a battery temperature determination unit 62c, a battery input-output control unit 62d, and an air conditioning control unit 62e. The air conditioning control unit 62e acquires the battery temperature detected by the battery temperature sensor 52, the cooling air temperature after passing through the evaporator 34 detected by the cooling air temperature sensor 53, and the set temperature of the vehicle cabin 12 set by the operation unit 70, the inside air temperature of the vehicle cabin 12 detected by the inside air temperature sensor 71, the outside air temperature outside the vehicle 10 detected by the outside air temperature sensor 72, and the solar radiation amount detected by the solar radiation sensor 73.

When the air conditioning device is driven within the predetermined load, the air conditioning control unit 62e performs the normal control, and controls the output of the blower 23, the opening degree of the inside-outside air switching door 24, the opening degree of the air mix door 26, the output of the heater 28, the output of the pump 29, the rotation speed of the compressor 32, the opening and closing of the air cooling solenoid valve 35, the opening degree of the air cooling expansion valve 36, the opening and closing of the battery cooling solenoid valve 43, and the opening and closing of the battery cooling expansion valve 44 so that the vehicle cabin temperature is the set temperature and the battery temperature is equal to or lower than the predetermined temperature.

When the battery temperature of the battery 11 is higher than the predetermined temperature during the above normal control is being performed, the air conditioning control unit 62e opens the battery cooling solenoid valve 43 and adjusts the opening degree of the battery cooling expansion valve 44 to adjust the coolant circulation amount in the battery cooling circuit 41 and thus, cools the battery 11 so that the battery temperature is equal to or lower than the predetermined temperature.

When Air Conditioning Device is Driven by Predetermined Load or More

When the air conditioning device 20 is driven by the predetermined load or more, the control unit 62 preferentially performs the next control without performing the normal control. Specifically, the air conditioning load determination unit 62a determines whether the air conditioning device 20 is driven by the predetermined load or more. For example, the air conditioning load determination unit 62a determines whether the rotation speed of the compressor 32 is equal to or higher than the predetermined rotation speed based on the rotation speed information of the compressor 32 output by the air conditioning control unit 62e to the compressor 32 so as to determine whether the air conditioning device 20 is driven by the predetermined load or more.

Then, the air conditioning control unit 62e closes the battery cooling solenoid valve 43 and stops cooling the battery 11 regardless of the temperature of the battery 11, when the air conditioning device 20 is driven by the predetermined load or more. Further, the battery input-output control unit 62d restricts at least one of the input and output of the battery 11 by controlling the inverter 17, when the air conditioning device 20 is driven by the predetermined load or more.

Here, when the input (power supply) to the battery 11 is restricted, the restriction may be, for example, prohibition of the input to the battery 11, or may be realized by setting the DC power input to the battery 11 to be a DC power of the predetermined value or less. Alternatively, the input limit to the battery 11 may be changed based on the battery temperature. For example, the maximum value of the DC power that can be input to the battery 11 may be decreased continuously or stepwise as the battery temperature increases.

Alternatively, the input restriction to the battery 11 may be such that while the maximum value of the DC power that can be input to the battery 11 is decreased continuously or stepwise as the battery temperature increases until the battery temperature reaches a predetermined temperature, the input to the battery 11 may be prohibited when the battery temperature becomes equal to or higher than the predetermined temperature. The input restriction to the battery 11 when the air conditioning device 20 is driven by the predetermined load or more may be an input restriction to the battery 11, in comparison with the above-mentioned normal control. For example, when the threshold value (maximum value) of the DC power that can be input to the battery 11 is set in the above normal control, the restriction of the power supply to the battery 11 when the air conditioning device 20 is driven by the predetermined load or more may be realized by lowering the threshold value more than the threshold value in the normal control.

Further, when the output of the electric power from the battery 11 is restricted, the restriction may be realized by setting the DC power output by the battery 11 to the predetermined DC power or less. Alternatively, the output limit from the battery 11 may be varied based on the battery temperature, for example, the maximum value of the DC power output by the battery 11 may be decreased continuously or stepwise as the battery temperature increases. The output restriction from the battery 11 when the air conditioning device 20 is driven by the predetermined load or more may be restricted to the output from the battery 11, in comparison with the above-mentioned normal control.

When Air Conditioning Device is Driven by Predetermined Load or More and at Least Either Condition that Outside Air Temperature is Below Predetermined Temperature or Condition that Battery Temperature is Below Predetermined Temperature is Satisfied FIG. 4 is a flowchart illustrating an example of the air conditioning control and the battery control performed by the vehicle control device 50. With reference to FIG. 4, when the power switch of the vehicle 10 is turned on and the motor generator 15 is started, the control is started, and in step S11, the air conditioning load determination unit 62a determines whether the air conditioning load equal to or higher than the predetermined value. When a negative determination is made in step S11, the process proceeds to step S12, the above-mentioned normal control is performed, then the control is returned, and steps S11 and onward are repeated.

In contrast, when an affirmative determination is made in step S11, the battery cooling solenoid valve 43 is closed and the cooling of the battery 11 is stopped in step S13, and in step S14, the outside air temperature determination unit 62b determines whether the outside air temperature is lower than the predetermined temperature based on the information from the outside air temperature sensor 72. When an affirmative determination is made in step S14, the battery temperature determination unit 62c determines in step S15 whether the battery temperature is lower than the predetermined temperature based on the information from the battery temperature sensor 52. When an affirmative determination is also made in step S15, the control is returned, and steps S11 and onward are repeated.

In contrast, when a negative determination is made in step S14 or a negative determination is made in step S15, while the power output from the battery 11 is not restricted, the power supply to the battery 11 is restricted in step S16. When step S16 is completed, the control is returned, and steps S11 and onward are repeated. This control ends when the power switch of the vehicle 10 is turned off.

As described above, according to the vehicle control device 50, the battery 11 is not cooled when the air conditioning device 20 is driven by a predetermined load or more. Thus, when the air conditioning device 20 is driven by a predetermined load or more, the cooling performance of the air conditioning device 20 used for cooling the battery 11 can be used for cooling the vehicle cabin 12, and the comfort of the occupants can be easily ensured.

Further, when the outside air temperature is equal to or higher than the predetermined temperature and the air conditioning device 20 is driven by the predetermined load or higher, the supply of electric power to the battery 11 is restricted. Thus, the heat generation of the battery 11 can be suppressed, and the rise in battery temperature can be suppressed. Further, when the temperature of the battery 11 is equal to or higher than the predetermined temperature and the air conditioning device 20 is driven by the predetermined load or higher, the supply of electric power to the battery 11 is restricted. Thus, the increase in the battery temperature can be suppressed even in this case.

Further, when the outside temperature at which the battery temperature does not easily rise is lower than the predetermined temperature and the battery temperature is lower than the predetermined temperature, the input-output of electric power to the battery 11 is not restricted. Thus, the input-output of electric power in the battery 11 is suppressed from being excessively restricted, and it is possible to suppress the deterioration of the running performance due to the restriction.

Further, when suppressing the heat generation of the battery 11, only the supply of electric power to the battery 11 is restricted, and the output of the electric power from the battery 11 is not restricted. Thus, it is possible to suppress an increase in the battery temperature while suppressing a deterioration of the traveling performance due to the output restriction of the battery 11.

The present disclosure is not restricted to the above-described embodiment and its modifications, and various improvements and changes can be made within the scope of the matter described in the claims of the present application and the equivalent scope thereof.

For example, in the above embodiment, when suppressing the heat generation of the battery 11, only the supply of electric power to the battery 11 is restricted, and the output of electric power from the battery 11 is not restricted. However, when suppressing the heat generation of the battery 11, in comparison to the normal control described above, both the supply of electric power to the battery 11 and the output of electric power from the battery 11 may be restricted, or the supply of power to the battery 11 may be restricted while the output of power from the battery 11 may be restricted.

Further, in addition to the condition that the air conditioning load is equal to or higher than the predetermined load, when at least either the outside temperature is equal to or higher than a predetermined temperature or the battery temperature is equal to or higher than a predetermined temperature is satisfied, a case in which at least one of the input or output of the battery 11 is restricted is described.

However, in addition to the condition that the air conditioning load is equal to or higher than a predetermined load, only when the outside temperature is equal to or higher than the predetermined temperature, at least one of the input and output of the battery may be restricted and the information of the battery temperature does not need to be used for the input-output restriction. Alternatively, in addition to the condition that the air conditioning load is equal to or higher than a predetermined load, only when the battery temperature is equal to or higher than the predetermined temperature, at least one of the input and output of the battery may be restricted and the information of the outside temperature does not need to be used for the input-output restriction. Alternatively, when the condition that the air conditioning load is equal to or more than the predetermined load is satisfied, at least one of the input and output of the battery may be restricted regardless of the other conditions.

Further, a case of determining whether the air conditioning load is equal to or higher than a predetermined load based on the rotation speed of the compressor 32 has been described. However, it may be determines that the air conditioning load is equal to or more than a predetermined load when at least one of the following conditions is satisfied, the rotation speed of the compressor 32>the predetermined rotation speed [rpm], the evaporator temperature>the predetermined temperature [° C.], the vehicle cabin temperature>the predetermined temperature [° C.], the blower output>the predetermined output [%], the amount of solar radiation>the predetermined amount of solar radiation [W/m$^2$], the outside air temperature>the predetermined temperature [° C.], and the air mix opening degree<the predetermined opening degree [%].

What is claimed is:

1. A vehicle control device that controls an air conditioning device and a battery in a vehicle that uses a coolant of the air conditioning device that cools a vehicle cabin for cooling the battery, the vehicle control device comprising:
   an air conditioning load determination unit that determines whether the air conditioning device is driven by a predetermined load or more; and
   a battery input-output control unit that controls at least one of an input power or an output power of the battery,
   wherein when the air conditioning device is driven by the predetermined load or more, at least one of the input power or the output power is restricted without cooling the battery.

2. The vehicle control device according to claim 1, further comprising:
   an outside air temperature detection unit that detects an outside air temperature of the vehicle; and an outside air temperature determination unit that determines whether the outside air temperature is lower than a predetermined temperature, wherein when the outside air temperature is lower than the predetermined temperature, the input power and the output power are not restricted.

3. The vehicle control device according to claim 1, further comprising:

a battery temperature detection unit that detects a temperature of the battery; and a battery temperature determination unit that determines whether the temperature of the battery is lower than a predetermined temperature, wherein when the temperature of the battery is lower than the predetermined temperature, the input power and the output power are not restricted.

4. The vehicle control device according to claim 1, wherein when the air conditioning device is driven by the predetermined load or more, only a supply of power to the battery is restricted and an output of power from the battery is not restricted.

* * * * *